(12) United States Patent
Marlin et al.

(10) Patent No.: US 12,110,829 B2
(45) Date of Patent: Oct. 8, 2024

(54) TURBOMACHINE FAN ASSEMBLY COMPRISING A ROLLER BEARING AND A DOUBLE-ROW BALL BEARING WITH OBLIQUE CONTACT

(71) Applicant: SAFRAN AIRCRAFT ENGINES, Paris (FR)

(72) Inventors: François Marie Paul Marlin, Moissy-Cramayel (FR); Didier Gabriel Bertrand Desombre, Moissy-Cramayel (FR); Christophe Paul Jacquemard, Moissy-Cramayel (FR); Laurent Paul François Perrot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/754,167

(22) PCT Filed: Sep. 7, 2020

(86) PCT No.: PCT/FR2020/051540
§ 371 (c)(1),
(2) Date: Mar. 25, 2022

(87) PCT Pub. No.: WO2021/058888
PCT Pub. Date: Apr. 1, 2021

(65) Prior Publication Data
US 2022/0290617 A1    Sep. 15, 2022

(30) Foreign Application Priority Data
Sep. 27, 2019 (FR) ........................ 1910715

(51) Int. Cl.
*F02C 7/36* (2006.01)
*F01D 25/16* (2006.01)
(Continued)

(52) U.S. Cl.
CPC ................ *F02C 7/36* (2013.01); *F01D 25/16* (2013.01); *F02C 7/06* (2013.01); *F16C 19/181* (2013.01);
(Continued)

(58) Field of Classification Search
CPC .... F02C 7/36; F02C 7/06; F01D 25/16; F16C 19/181; F16C 19/54; F16C 19/505;
(Continued)

(56) References Cited

U.S. PATENT DOCUMENTS 3,909,085 A * 9/1975 Wilkinson ............ F16C 25/083
384/517
11,401,869 B2 * 8/2022 Morreale ............ F16H 57/0479
(Continued)

FOREIGN PATENT DOCUMENTS

FR        3046407 A1      7/2017
GB        1445015    *    8/1976 ................ F02C 3/10
WO     WO-2018189457 A1 * 10/2018 ............ F01D 25/16

OTHER PUBLICATIONS

Search Report issued in French Patent Application No. 1910715 dated Jun. 26, 2020.
(Continued)

*Primary Examiner* — Woody A Lee, Jr.
*Assistant Examiner* — Joshua R Beebe
(74) *Attorney, Agent, or Firm* — Pearne & Gordon LLP

(57) ABSTRACT

An aircraft propulsion assembly including a fan shaft which is connected to a turbine shaft by means of a reduction gear.
(Continued)

The guiding of the fan shaft is carried out by a first bearing including cylindrical rollers and a second beating including two rows of balls with oblique contact.

8 Claims, 3 Drawing Sheets

(51) Int. Cl.
  *F02C 7/06* (2006.01)
  *F16C 19/18* (2006.01)
(52) U.S. Cl.
  CPC ...... *F05D 2220/36* (2013.01); *F05D 2240/50* (2013.01); *F16C 2360/23* (2013.01)
(58) Field of Classification Search
  CPC ...... F16C 19/495; F16C 19/492; F16C 19/08; F16C 19/18; F16C 19/182; F16C 19/183; F16C 19/184; F16C 19/185; F16C 19/186; F16C 19/187; F16C 19/188; F16C 2360/23; F16C 23/06; F16C 33/60; F16C 33/58; F16C 33/40; F16C 33/405; F05D 2220/36; F05D 2240/50; F05D 2240/54; F05D 2250/73
  See application file for complete search history.

(56) References Cited

U.S. PATENT DOCUMENTS

| | | | |
|---|---|---|---|
| 2007/0172166 A1* | 7/2007 | Kawaguchi | F16C 19/182 384/512 |
| 2013/0323047 A1 | 12/2013 | Van Duyn et al. | |
| 2014/0099199 A1* | 4/2014 | Kerr | F16C 33/6677 384/475 |
| 2014/0230403 A1* | 8/2014 | Merry | F02C 7/06 60/226.1 |
| 2015/0362013 A1* | 12/2015 | Gorajski | F16C 19/505 384/512 |
| 2017/0122214 A1* | 5/2017 | Morelli | F01D 25/16 |
| 2020/0003068 A1* | 1/2020 | Fontana | F01D 15/12 |
| 2020/0232509 A1* | 7/2020 | Iglewski | F16C 33/60 |

OTHER PUBLICATIONS

International Search Report for issued in Application No. PCT/FR2020/051540 dated Dec. 14, 2020.
Written Opinion for PCT/FR2020/051540 dated Dec. 14, 2020.

* cited by examiner

TURBOMACHINE FAN ASSEMBLY COMPRISING A ROLLER BEARING AND A DOUBLE-ROW BALL BEARING WITH OBLIQUE CONTACT

This is the National Stage of PCT international application PCT/FR2020/051540, filed on Sep. 7, 2020 entitled "TURBOMACHINE FAN ASSEMBLY COMPRISING A ROLLER BEARING AND A DOUBLE-ROW BALL BEARING WITH OBLIQUE CONTACT", which claims the priority of French Patent Application No. 1910715 filed Sep. 27, 2019, both of which are incorporated herein by reference in their entireties.

TECHNICAL FIELD

The invention relates to the field of guidance and axial retention of a fan shaft of an aircraft turbomachine.

Without limitation, the invention relates more specifically to the field of turbojet engines comprising a reduction gear between the fan shaft and a turbine shaft.

PRIOR ART

Some twin-spool turbojet engines comprise a reduction gear between the fan shaft and the low-pressure turbine shaft. Such a reduction gear causes an axial decoupling of these shafts, meaning that an axial force applied to one of these shafts does not, as such, induce an axial stress on the other shaft.

Depending on the different flight phases of the aircraft, the axial force applied on the fan shaft could be reversed. In the cruise phase, the fan shaft is subjected to an axial force tending to drive it upstream of the turbojet whereas in the deceleration phase, or in autorotation, this shaft is subjected to an axial force tending to drive it downstream of the turbojet.

In a reduction gear architecture, the axial retention of the fan is typically ensured by one or several guide bearing(s) of the fan shaft.

In particular, there are turbojets wherein the fan shaft is guided in rotation by a bearing including two rows of conical rollers. Such a bearing allows holding the fan axially, each row of rollers forming with corresponding inner and outer rings an axial stop in a respective direction.

The preload of such a bearing has a direct incidence on the amplitude of the axial and radial movements of the blades of the fan, and therefore on the radial clearance that should be provided for between these blades and the fan casings. Conversely, this radial clearance should also enable the expansion of the fan casings when they heat up. Consequently, the thermal expansion of fan casings requires reducing the bearing preload to achieve a relatively soft preload. This results in a reduction of the aerodynamic performances. This also results in a reduction of the service life of the reduction gear.

In addition, the aforementioned architecture is complex to implement, in particular in terms of setting of the bearing with a double-row of conical rollers.

DISCLOSURE OF THE INVENTION

The invention aims to provide a fan assembly capable of overcoming such drawbacks so as to improve the aerodynamic performances of the turbomachine and, where appropriate, increase the service life of the reduction gear.

Another aim of the invention is to provide a fan assembly that is simpler to implement than an architecture comprising a bearing with a double-row of conical rollers.

To this end, an object of the invention is a fan assembly for an aircraft turbomachine, this assembly comprising a fan shaft and first and second bearings configured to guide the fan shaft in rotation about a central axis, this assembly being characterised in that the first bearing has cylindrical rollers and the second bearing has a double-row of balls with oblique contact.

The first bearing, with cylindrical rollers, allows taking up the radial forces of the fan as well as the radial stresses resulting from the thermal expansion of the bearing supports and the casings of the fan. Amongst other advantages, the radial bulk of such a bearing is relatively limited.

The second double-row ball bearing with oblique contact allows taking up the axial forces of the fan shaft, in both directions, as well as the radial forces.

Such a fan assembly allows achieving a relatively significant preload of the second bearing, and therefore increasing the rigidity of the second bearing so as to reduce the amplitude of the axial and radial movements of the fan shaft.

Thus, the invention allows reducing the radial clearance between the blades and the casings of the fan so as to improve the aerodynamic performances of the turbomachine. When such a fan assembly is mounted in a turbomachine comprising a reduction gear between the fan shaft and a turbine shaft, the rigid preload of the second bearing also allows reducing the radial and axial clearance in the gear of the reduction gear, which allows preserving the teeth of this gear and increasing the service life of the reduction gear.

Given the reduction of the axial and radial movements of the fan shaft, it is further possible to use a reduction gear having a herringbone toothing and thus reduce the corresponding vibrations.

As regards the structure of the second bearing more specifically, it is preferred that the latter comprises first and second rows of balls, and an inner ring and an outer ring each comprising first and second races, the first race of the inner and outer rings receiving the first row of balls, the second race of the inner and outer rings receiving the second row of balls.

In one embodiment, one amongst the inner and outer rings of the second bearing may comprise a first half-ring forming the first race of this ring and a second half-ring forming the second race of this ring.

Preferably, the first and second half-rings could together form the inner ring of the second bearing.

Making of one of the rings of the second bearing in the form of two half-rings facilitates mounting and dismounting of this bearing.

Preferably, the other one amongst the inner and outer rings of the second bearing may comprise a unique part forming the first and second races of this ring. For example, the inner ring of the second bearing may comprise said first and second half-rings, and the outer ring of this bearing may be made in one piece.

In one embodiment, the balls of the first row may have a diameter different from the balls of the second row.

The difference in diameter between the balls of the first and second rows allows sizing them according to the respective forces to which they are actually subjected during the implementation of the turbomachine.

In particular, the axial force on the fan shaft in the cruise phase, exerted from downstream to upstream along said central axis, is higher than that in the idle or autorotation phase, which is exerted along said central axis from upstream to downstream.

In the case of a X-like mounting of the second bearing, the balls of the upstream row may consequently have a diameter larger than the diameter of the balls of the downstream row since it is the balls of the upstream row which are in this case loaded in the cruise phase, and vice versa in the case of an O-like mounting (see below for a X- or O-like mounting). Preferably, the difference in diameter between the balls of the first row and of the second row could be such that the ratio of the diameter of the balls of one of these rows and the diameter of the balls of the other row is higher than 1.5.

According to a first variant, mounting of the second bearing could be done in a X-like fashion, i.e. the first and second races of the outer ring of the second bearing could be axially located between the first and second races of the inner ring of the second bearing. In other words, in the case of a X-like arrangement, the two rows of balls establish an axially outward contact with the corresponding races of the outer ring and an axially inward contact with the corresponding races of the inner ring.

According to a second variant, mounting of the second bearing could be done in an O-like fashion, i.e. the first and second races of the outer ring of the second bearing could be axially located between the first and second races of the inner ring of the second bearing. In other words, in the case of an O-like mounting, the two rows of balls establish an axially outward contact with the corresponding races of the inner ring and an axially inward contact with the corresponding races of the outer ring.

Such an O-like mounting increases the stability of the bearing and in particular the angular stiffness of a fixed support supporting the outer ring, in comparison with a X-like mounting. In the case where such a fixed support also supports the outer ring of the first roller bearing, the stiffness conferred by such an O-like mounting allows, where appropriate, reducing the load on the flexible cage of the first bearing, and possibly suppressing this flexible cage.

The fan assembly according to the invention may comprise a fixed support configured to support an outer ring of the second bearing, the support and the outer ring of the second bearing each comprising a connecting element forming a respective bearing surface, said connecting elements being configured so that:
 a force applied on the fan shaft according to a first direction along said central axis tends to press against each other the bearing surfaces of said connecting elements,
 a force applied on the fan shaft according to a second direction along said central axis tends to bring the bearing surfaces of said connecting elements away from each other.

Preferably, the bearing surfaces may be perpendicular to said central axis, so that the bearing surface formed by the connecting element of the fixed support is axially opposite the bearing surface formed by the outer ring of the second bearing.

To hold the bearing surfaces against each other, in particular when the force on the fan shaft is applied according to said second direction, the fan assembly may comprise fastening means such as bolts configured to fix together the support and the outer ring of the second bearing by their connecting element.

In particular, the above-described configuration allows not loading the fastening means at cruise speed.

In one embodiment, the fan shaft may comprise a first support portion carrying an inner ring of the first bearing, a second support portion carrying an inner ring of the second bearing, a first frustoconical junction portion connecting together the first and second support portions, and a second frustoconical junction portion intended to connect together the second support portion and a reduction gear of the turbomachine, said second support portion having a radial thickness larger than a radial thickness of the first and second frustoconical junction portions.

In other words, an excess thickness of the fan shaft could be provided at the second bearing, which allows limiting the creep phenomenon of this shaft in the event of overheating and avoiding an embrittlement of the other portions of this shaft and of the fan assembly.

Another object of the invention is an aircraft turbomachine, this turbomachine comprising a fan assembly as defined hereinabove.

In one embodiment, this turbomachine may comprise a turbine shaft and a reduction gear configured to reduce the rotational speed between the turbine shaft and the fan shaft. Preferably, the first bearing, with cylindrical rollers, could be axially aligned with blades of the fan assembly of the turbomachine.

The second bearing, with a double-row of balls with oblique contact, could be axially positioned between the first bearing with cylindrical rollers and the reduction gear.

Another object of the invention is a propulsion unit comprising such a turbomachine, or comprising more generally a fan assembly as defined hereinabove, as well as an aircraft comprising such a propulsion unit.

Finally, the invention also relates to methods for mounting and dismounting a fan assembly as defined hereinabove.

Other advantages and features of the invention will appear upon reading the following detailed non-limiting description.

BRIEF DESCRIPTION OF THE DRAWINGS

The following detailed description refers to the appended drawings wherein.

DETAILED DESCRIPTION OF EMBODIMENTS

Figure 1:
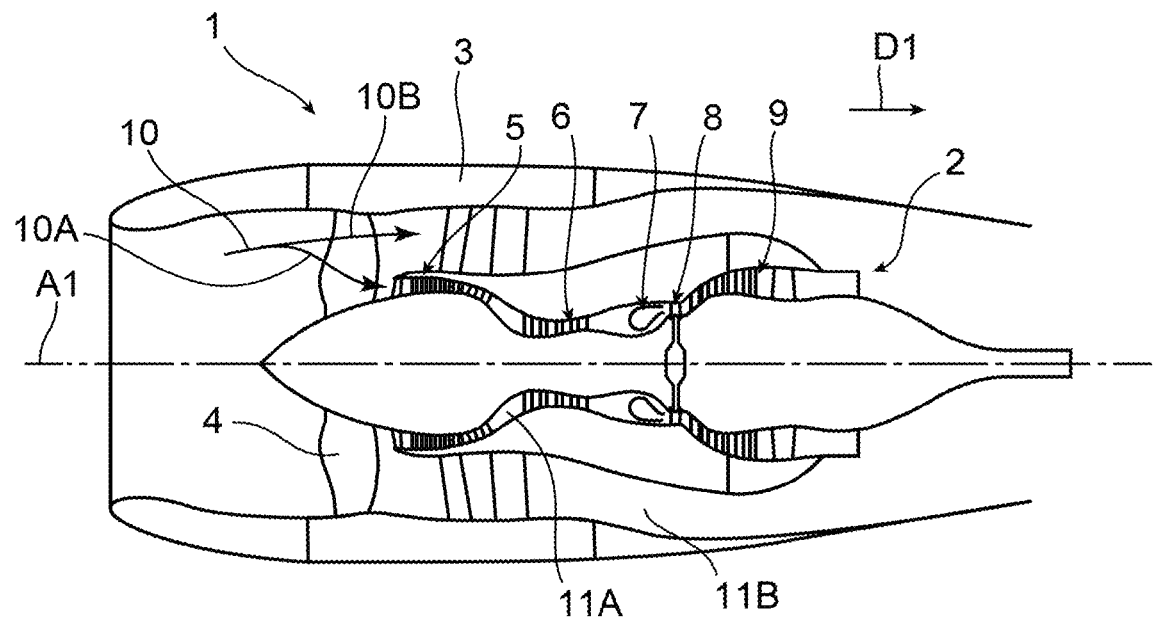
FIG. 1 is a schematic view in axial section of an aircraft propulsion unit comprising a twin-spool bypass turbojet engine in accordance with the invention.

In FIG. 1, an aircraft propulsion unit 1 comprising a turbomachine 2 streamlined by a nacelle 3 is represented. In this example, the turbomachine 2 is a twin-spool bypass turbojet engine well-known in the aeronautical industry.

Next, the terms "upstream" and "downstream" are defined with respect to a main direction D1 of gas flow through the propulsion unit 1 when the latter is propelled.

The turbojet engine 2 has a longitudinal central axis A1 around which its different components extend, in this case, from upstream to downstream of the turbojet engine 2, a fan whose blades 4 appear in FIG. 1, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

Turbojet 2 is a twin-spool one meaning that the low-pressure compressor 5 and low-pressure turbine 9 comprise a rotor carried by a low-pressure spool shaft, whereas the high-pressure compressor 6 and the high-pressure turbine 8 comprise a rotor carried by a low-pressure spool shaft. These high- and low-pressure spool shafts are intended to be rotated about the axis A1 at different speeds.

Conventionally, during the operation of such a turbojet engine 2, an air flow 10 penetrates the propulsion unit 1 through an air inlet upstream of the nacelle 3, crosses the blades 4 of the fan and is then split into a central primary flow 10A and a secondary flow 10B. The primary flow 10A flows in a main duct 11A for the circulation of the gases passing through the compressors 5 and 6, the combustion chamber 7 and the turbines 8 and 9. In turn, the secondary flow 10B flows in a secondary duct 11B surrounding the gas generator and delimited radially outwards by the nacelle 3.

Figure 2:
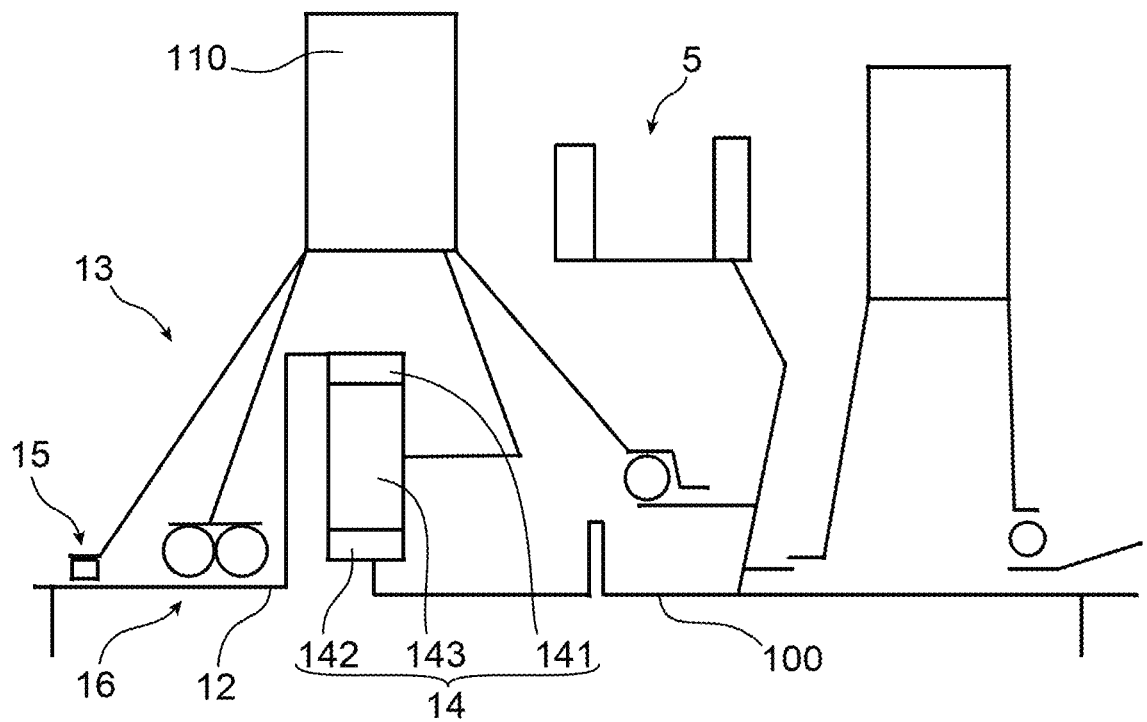
FIG. 2 is a schematic view of an aircraft propulsion unit architecture in accordance with the invention.

FIG. 2 schematically shows a turbojet engine 2 architecture comprising a fan assembly 13 in accordance with the invention, a low-pressure spool shaft 100 and a reduction gear 14.

The fan assembly 13 comprises at least one portion of the fan including a fan shaft 12 and means 16 for guiding this shaft 12.

In a manner known per se, the reduction gear 14 is an epicyclic reduction gear comprising a ring gear 141, an internal sun gear 142 and planet gears 143.

In this example, ring gear 141 is secured to the fan shaft 12 and the internal sun gear 142 is secured to the low-pressure spool shaft 100. The planet gears 143 are guided in rotation by a planet carrier (not represented) secured to an inlet casing 110 of the turbojet engine 2.

Thus, the reduction gear 14 connects the fan shaft 12 to the low-pressure spool shaft 100 so as to reduce the rotational speed of the fan shaft 12 relative to the rotational speed of the low-pressure spool shaft 100, which allows for an improvement of the propulsive efficiency of the turbojet engine 2.

Figure 3:
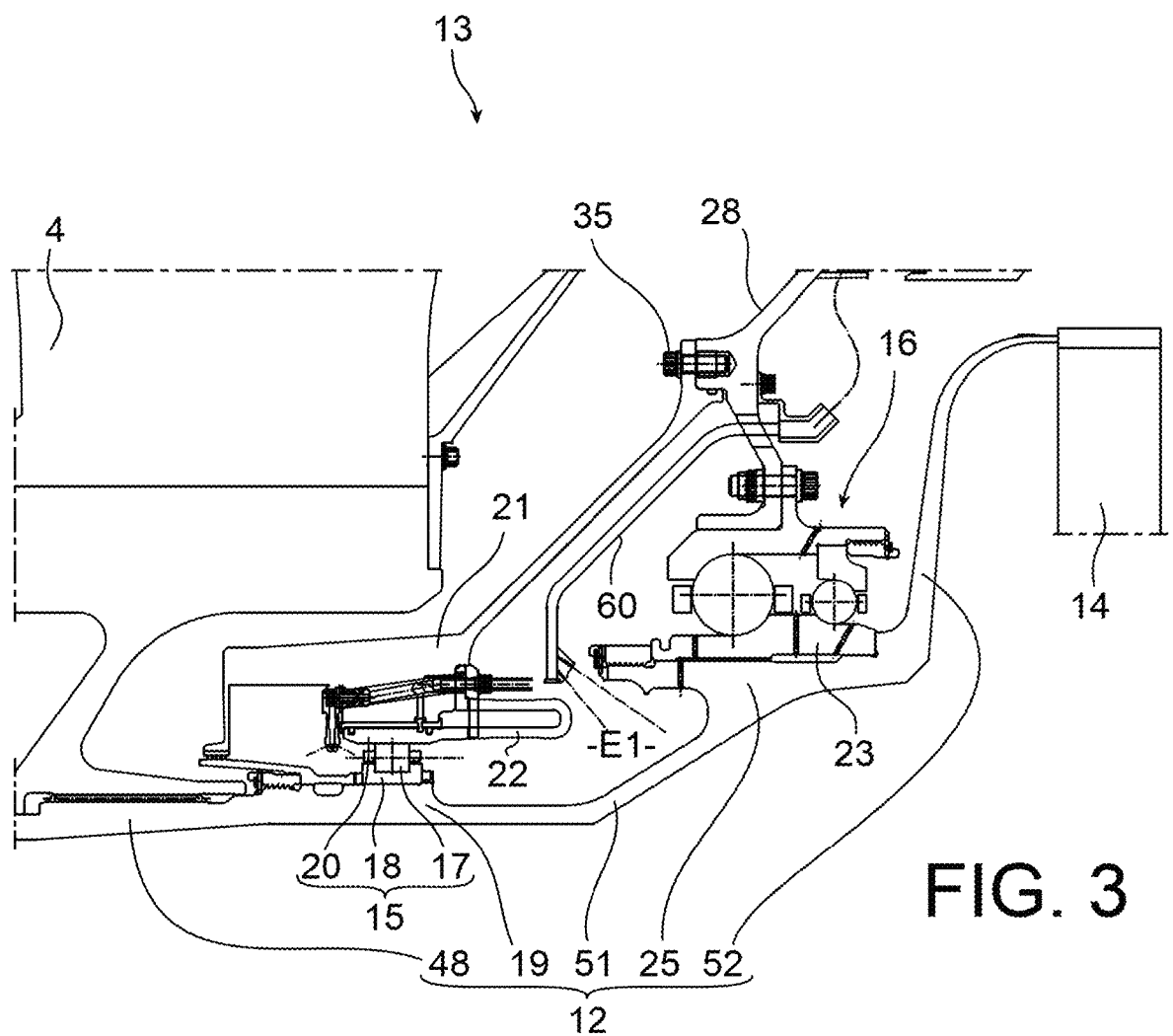
FIG. 3 is a partial schematic view in axial section of a fan assembly in accordance with the invention, this fan assembly comprising a double-row ball bearing with oblique contact according to a first embodiment.

A fan assembly 13 in accordance with the invention is represented in more detail in FIG. 3.

Referring to FIG. 3, the guidance of the fan shaft 12, in rotation about the longitudinal central axis A1 of the turbojet engine 2, is ensured by two bearings 15 and 16.

The first bearing 15, or upstream bearing, is a roller bearing 17.

In this example, the rollers 17 of the upstream bearing 15 are cylindrical.

The upstream bearing 15 comprises a radially inner ring 18 mounted on a first support portion 19 of the fan shaft 12, for example by press-fitting, so as to be secured to this shaft 12 in rotation about the axis A1.

The upstream bearing 15 comprises a radially outer ring 20 connected to a branch 21 of a fixed casing of the turbojet engine 2 via a flexible cage 22 having a radial damping function. In this example, the fixed casing corresponds to the inlet casing 110 of FIG. 2. The implementation of such a flexible cage 22 being well known in the state of the art, its structure and its operation are not described further in the present description.

In addition, the connection between the outer ring 20 of the upstream bearing 15 and the casing 110 may be made by any other connection means, for example by a direct connection.

The second bearing 16, or downstream bearing, is a double-row ball bearing with oblique contact.

Figure 4:
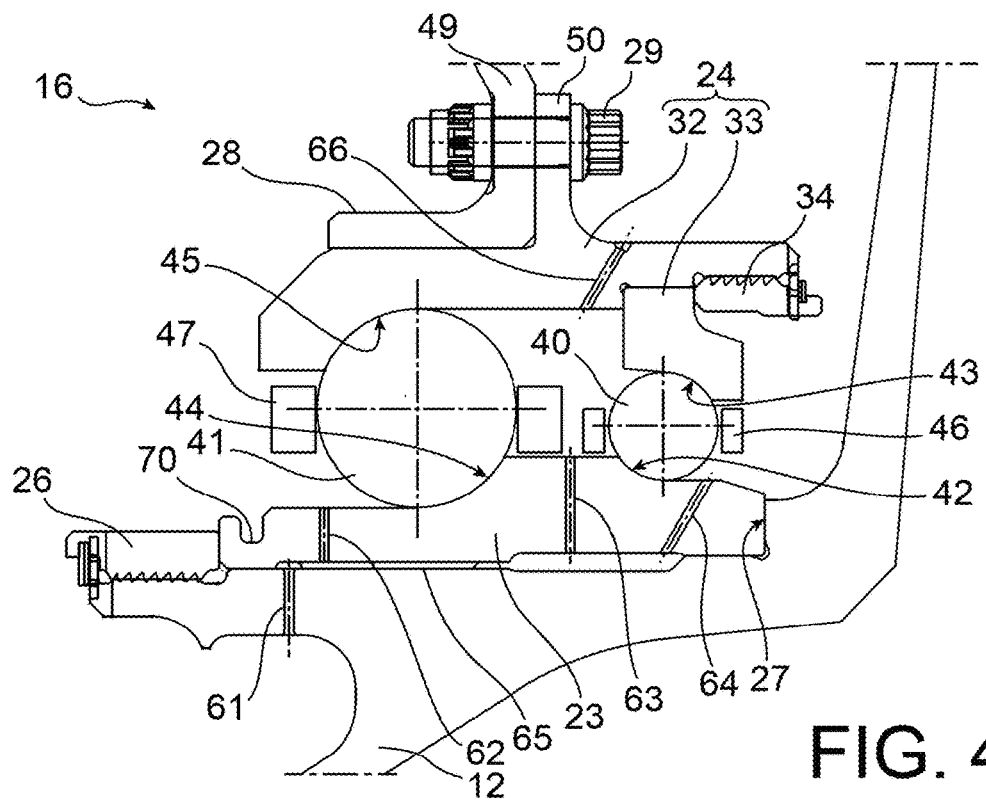
FIG. 4 is a partial schematic view in axial section of the double-row ball bearing with oblique contact of FIG. 3.

Referring to FIG. 4 which shows an enlargement of the downstream bearing 16 of FIG. 3, the downstream bearing 16 comprises a radially inner ring 23 and a radially outer ring 24.

The inner ring 23 is mounted on a second support portion 25 of the fan shaft 12, for example by press-fitting, so as to be secured to this shaft 12 in rotation about the axis A1. In this example, holding of the inner ring 23 in axial position is achieved by a nut 26 screwed onto the shaft 12 upstream of the inner ring 23 and exerting thereon a pressing force against a shoulder 27 of the fan shaft 12. In a non-represented embodiment, a shim may be placed between the inner ring 23 and the shoulder 27 (see further below).

In turn, the outer ring 24 is connected to a support 28, for example by press-fitting, and fastened to this support 28 by the screw-nut type fastening means 29, ensuring both axial and rotational holding of the outer ring 24 with respect to the support 28.

Referring to FIG. 3, the support 28 of the outer ring 24 of the downstream bearing 16 and said casing 110 branch 21 connected to the outer ring 20 of the upstream bearing 15 are in this example connected to each other by fastening means 35 such as screws so as to form together a portion of said fixed casing 110 of the turbojet engine 2.

In the example of FIG. 4, the inner ring 23 of the downstream bearing 16 is made in one piece and the outer ring 24 comprises two portions 32 and 33 respectively forming an upstream outer ring element (or upstream outer half-ring) and a downstream outer ring element (or downstream outer half-ring).

The upstream outer ring element 32 forms a main portion of the outer ring 24 in particular in that it connects the outer ring 24 to the support 28 and carries in this example the downstream outer ring element 33.

To this end, the upstream outer ring element 32 comprises a housing receiving the downstream outer ring element 33 (see FIG. 4).

Holding of the upstream 32 and downstream 33 outer ring elements in axial position with respect to each other is achieved by a threaded element 34 screwed onto the upstream outer ring element 32 so as to clasp the downstream outer ring element 33 between this threaded element 34 and a shoulder of the upstream outer ring element 32.

The downstream bearing 16 comprises a first row of balls 40, or downstream row of balls, and a second row of balls 41, or upstream row of balls. These two rows of balls 40 and 41 are fitted in respective races of the rings 23 and 24 so as to establish an oblique contact with these races.

More specifically, in the configuration of FIG. 4, the downstream row of balls 40 bears against a race 42 formed by the inner ring 23 and against a race 43 formed by the downstream outer ring element 33. In turn, the row of upstream balls 41 bears against a race 44 formed by the inner ring 23 and against a race 45 formed by the upstream outer ring element 32.

The races 42 and 43 are referred to as "downstream races" or "first races" because they cooperate with the downstream row of balls 40 or first row of balls. Similarly, the races 44 and 45 are referred to as "upstream races" or "second races" because they cooperate with the upstream row of balls 41 or second row of balls.

The downstream races 42 and 43 and the upstream races 44 and 45 are configured so that, in the configuration of FIG. 4, these exert an axial prestress respectively on the downstream row of balls 40 and the upstream row of balls 41, preventing relative axial movement of the inner 23 and outer 24 rings respectively in a first and a second direction. This axial prestress, or preload, is obtained by tightening the upstream 32 and downstream 33 outer ring elements against each other using the threaded element 34.

Of course, the bearing 16 comprises cages 46 and 47 configured to hold the balls, respectively downstream 40 and upstream 41 rows, circumferentially spaced apart from each other, in order to distribute the forces circumferentially and allow the proper operation of the bearing 16.

The bearing 16 of FIG. 4 corresponds to an X-like mounting of its elements, the downstream race 42 and the upstream race 44 of the inner ring 23 being axially located between the downstream race 43 and the upstream race 45 of the outer ring 24.

In the embodiment of FIG. 4, the balls of the upstream row 41 have a larger diameter, close to twice that of the balls of the downstream row 40.

Indeed, in this case, the balls of the upstream row 41 are loaded in the cruise phase during which the fan shaft 12 is driven from downstream to upstream. Hence, in principle, these balls are loaded more than those of the downstream row 40.

Nonetheless, such a ball size differential presupposes a corresponding differential of the radial coordinates of the respective races of the inner 23 and outer 24 rings. In the example of FIG. 4, this condition is met by making the outer ring 24 into two elements 32 and 33, the downstream outer ring element 33 being configured to shift radially inwards the race 43 formed by this element 33 with respect to the radial coordinate of the race 45 formed by the upstream outer ring element 32.

Figure 5:
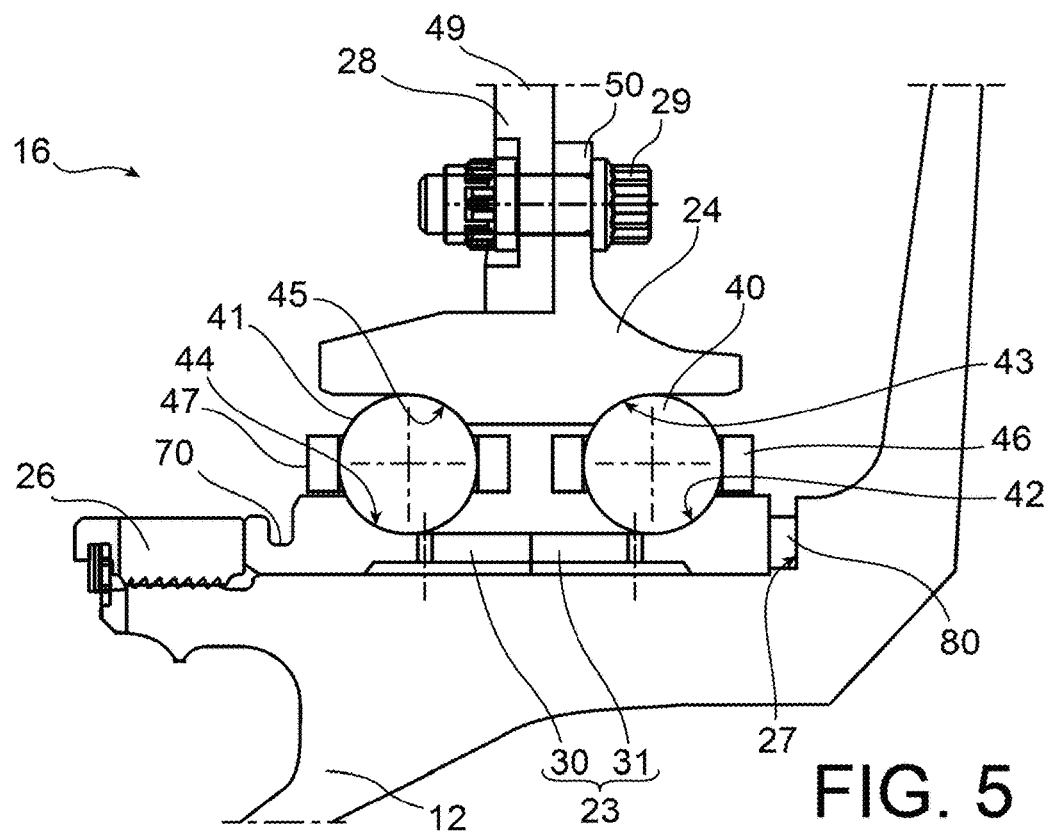
FIG. 5 is a partial schematic view in axial section of a double-row ball bearing with oblique contact according to a second embodiment, for a fan assembly according to the invention.

FIG. 5 shows another embodiment of the downstream bearing 16, wherein the balls of each row have an identical dimension, which particularly allows simplifying this bearing.

The bearing 16 of FIG. 5 is described hereinafter by its differences from that of FIG. 4. The inner ring 23 of the bearing 16 of FIG. 5 comprises two half-rings 30 and 31 with a substantially identical axial dimension with respect to each other, each forming an annular axial portion of the substantially symmetrical inner ring 23. The upstream inner half-ring 30 and the downstream inner half-ring 31 respectively form the upstream race 44 and the downstream race 42 of the inner ring 23. The upstream 30 and downstream 31 inner half-rings are configured axially opposite each other so that tightening of the nut 26 causes pressing of the upstream inner half-ring 30 against the downstream inner half-ring 31, and pressing of the latter against a shim 80 interposed between the downstream inner half-ring 31 and the shoulder 27 of the fan shaft 12 (see further below the interest of such a shim 80).

The outer ring 24 of the bearing 16 in FIG. 5 is made in one piece forming both the downstream race 43 receiving the downstream row of balls 40 and the upstream race 45 receiving the upstream row of balls 41.

The bearing 16 of FIG. 5 corresponds to an O-like mounting, the downstream race 43 and the upstream race 45 of the outer ring 24 being axially located between the downstream race 42 and the upstream race 44 of the inner ring 23.

The rigidity conferred by an O-like mounting of the downstream bearing 16 allows relieving the upstream bearing 15, possibly enabling a mounting of the fan assembly 13 without a flexible cage 22.

Without limitation, the inner 23 and outer 24 rings of the downstream bearing 16 may be made of a metallic material such as M50 type steel for the inner ring 23, and M50NIL or 32CDV13 type steel for the outer structural ring 24. The balls of the upstream 41 and downstream 40 rows may be made of M50 type steel or of a ceramic.

In each of the embodiments of FIGS. 4 and 5, the support 28 is configured to support the outer ring 24 of the bearing 16 by respective connecting elements of these parts. More specifically, the support 28 comprises a connecting element 49 consisting of a portion of the support forming a support surface substantially perpendicular with respect to the axis A1.

The outer ring 24 also comprises a connecting element 50 projecting radially outwards with respect to the other portions of the outer ring 24, this connecting element 50 forming a bearing surface substantially perpendicular with respect to the axis A1 and axially opposite the bearing surface of the connecting element 49 of the support 28.

Such a configuration of the connecting elements 49 and 50 of the support 28 and of the outer ring 24 results, on the one hand, in a pressing of the bearing surfaces of these connecting elements 49 and 50 against each other when a force is applied on the fan shaft 12 according to a direction from downstream to upstream along said central axis A1. It results on the other hand in a distancing of these bearing surfaces, relative to each other, when a force is applied on the fan shaft 12 according to a reverse direction, from upstream downstream along said central axis A1.

This configuration enables the support 28 to take up the thrust force of the fan shaft 12, when the latter is driven upstream of the turbojet engine 2, in particular in the cruise phase, without loading the fastening means 29.

Moreover, as regards the geometry of the fan shaft 12, visible in FIG. 3, this comprises in particular, from upstream to downstream:
- a section 48 carrying a disc which includes the blades 4 of the fan, the connection between this section 48 and the disc being preferably splined,
- said first support portion 19 carrying the inner ring 18 of the upstream bearing 15, the diameter of this first support portion 19 being close to that of the section 48 and being axially contiguous with respect to this section 48,
- a first frustoconical junction portion 51 connecting together the first 19 and second 25 support portions so that the diameter of the second support portion 25 is larger than the diameter of the first support portion 19, this first frustoconical junction portion 51 delimiting a lubrication enclosure E1 of the downstream bearing 16,
- said second support portion 25 carrying the inner ring 23 of the downstream bearing 16,
- a second frustoconical junction portion 52 connecting together the second support portion 25 and the reduction gear 14 so that the diameter of the portion of the shaft 12 cooperating with the reduction gear 14 is larger than the diameter of the second support portion 25.

These different portions of the fan shaft 12 are substantially connected to each other by their axial ends, with the exception of the second support portion 25 which is connected to the first frustoconical junction portion 51 by a portion forming a radial excess thickness at an axially central region of this support portion 25.

Thus, the second support portion 25 comprises a free upstream axial end which also delimits the lubrication enclosure E1.

In the example of FIG. 3, a sprinkler 60 is configured to introduce lubricating oil into this enclosure E1.

Under the action of the centrifugal force, the oil present in the enclosure E1 is routed into the downstream bearing 16 through orifices 61-64 and grooves 65 arranged in the second support portion 25 and in the inner ring 23 of the downstream bearing 16 (see FIG. 4). This oil is discharged from bearing 16 through drain orifices 66.

Methods for mounting and dismounting the downstream bearing 16 are given as an example hereinafter.

Mounting of the bearing 16 of FIG. 4 may comprise, preferably in order, the following steps:
- a step of positioning the inner ring 23 on the second support portion 25 of the fan shaft 12, optionally with the interposition of a shim between the inner ring 23 and the shoulder 27 in order to position the fan shaft 12 axially with respect to the fixed casing 110 (the shim is not represented in FIG. 4);
- a step of setting up the rows of downstream 40 and upstream 41 balls, and of the corresponding cages 46 and 47;
- a step of positioning the downstream outer ring element 33;
- a step of setting up the upstream outer ring element 32, by interlocking on the downstream outer ring element 33;
- a step of screwing the threaded element 34 so as to clamp the upstream 32 and downstream 33 outer ring elements against each other, this step allowing preloading the bearing 16;
- a step for positioning and fastening the support 28 on the outer ring 24;
- a step of tightening the nut 26 so as to axially block the inner ring 23.

Mounting of the bearing 16 of FIG. 5 may comprise, preferably in order, the following steps:
- a step of setting up the downstream internal half-ring 31 on the second support portion 25 of the fan shaft 12, optionally with the interposition of a shim 80 between the downstream inner half-ring 31 and the shoulder 27 in order to position the fan shaft 12 axially with respect to the fixed casing 110;
- a step for setting up the downstream row of balls 40 and the corresponding cage 46;
- a step for setting up the outer ring 24 on the support 28;
- a step for setting up the upstream row of balls 41 and the corresponding cage 47;
- a step of setting up the upstream inner half-ring 30 on the second support portion 25 of the fan shaft 12;
- a step of screwing the nut 26 so as to tighten the upstream 30 and downstream 31 inner half-rings against each other, this step allowing preloading the bearing 16 and axially blocking the inner ring 23.

In each of the embodiments of FIGS. 4 and 5, dismounting of the bearing 16 may comprise corresponding steps carried out in reverse order.

The removal of the inner ring 23 with respect to the fan shaft 12 may be carried out using a jaw puller cooperating with a groove 70 of the inner ring 23.

Referring to FIG. 2, it arises from the previous description that the preload of the bearing 16 allows limiting the axial clearance of the ring gear 141 of the reduction gear 14, the ring gear 141 being secured to the fan shaft 12 and guided in rotation by the bearing 16. This results in a reduction of the misalignments in the reduction gear 14, in particular between the ring gear 141 and the planet gears 143, allowing extending the service life of the reduction gear 14.

The above-described embodiments are in no way limiting, the invention covering any fan assembly 13 whose fan shaft 12 is guided by a first roller bearing 15 and a second double-row ball bearing with oblique contact 16. For example, the invention also applies to a turbomachine devoid of a reduction gear 14 between the fan shaft 12 and the gas generator, whose architecture could cause a reversal of the axial force of the fan shaft during the operation of the turbomachine.

What is claimed is:

1. A fan assembly for an aircraft turbomachine, the assembly comprising a fan shaft and first and second bearings configured to guide the fan shaft in rotation about a central axis, wherein the first bearing has cylindrical rollers and the second bearing has a double-row of balls with oblique contact,
   wherein the second bearing comprises first and second rows of balls, and an inner ring and an outer ring each comprising first and second races, the first race of the inner and outer rings receiving the first row of balls, the second race of the inner and outer rings receiving the second row of balls, and
   wherein the fan shaft comprises a first support portion carrying an inner ring of the first bearing, a second support portion carrying an inner ring of the second bearing, a first frustoconical junction portion connecting together the first and second support portions, and a second frustoconical junction portion intended to connect together the second support portion and a reduction gear of the turbomachine, said second support portion having a thickness taken perpendicular to a longitudinal extent thereof that is larger than a thickness of the first frustoconical junction portion taken perpendicular to a longitudinal extent thereof and a thickness of the second frustoconical junction portion taken perpendicular to a longitudinal extent thereof.

2. The assembly according to claim 1, wherein one amongst the inner and outer rings of the second bearing comprises a first half-ring forming the first race of this ring and a second half-ring forming the second race of this ring.

3. The assembly according to claim 1, wherein the balls of the first row have a diameter different from the balls of the second row, such that the ratio of the diameter of the balls of one of these rows and the diameter of the balls of the other row is higher than 1.5.

4. The assembly according to claim 1, wherein the first and second races of the outer ring of the second bearing are axially located between the first and second races of the inner ring of the second bearing.

5. The assembly according to claim 1, further comprising a fixed support configured to support an outer ring of the second bearing, the support and the outer ring of the second bearing each comprising a connecting element forming a respective bearing surface, said connecting elements being configured so that:
   a force applied on the fan shaft according to a first direction along said central axis tends to press against each other the bearing surfaces of said connecting elements,
   a force applied on the fan shaft according to a second direction along said central axis tends to bring the bearing surfaces of said connecting elements away from each other.

6. An aircraft turbomachine, said turbomachine comprising a fan assembly according to claim 1.

7. The turbomachine according to claim 6, further comprising a turbine shaft and a reduction gear configured to reduce the rotational speed between the turbine shaft and the fan shaft.

8. A propulsion unit for an aircraft, said propulsion unit comprising a turbomachine according to claim 6.

* * * * *